(12) United States Patent
Dean et al.

(10) Patent No.: US 7,690,004 B1
(45) Date of Patent: Mar. 30, 2010

(54) METHOD OF PROVIDING CONSISTENT INTERFACE TO IMAGE ACQUISITION DEVICES

(75) Inventors: Loren Dean, Hopedale, MA (US);
Robert DeSonia, Kihei, HI (US); John Holohan, Newton Centre, MA (US);
Christian Portal, Holliston, MA (US);
Dave Tarkowski, Framingham, MA (US)

(73) Assignee: The Math Works, Inc., Natick, MA (US)

( * ) Notice: Subject to any disclaimer, the term of this patent is extended or adjusted under 35 U.S.C. 154(b) by 1206 days.

(21) Appl. No.: 10/729,752

(22) Filed: Dec. 4, 2003

(51) Int. Cl.
*G06F 3/00* (2006.01)
*G06F 15/173* (2006.01)
(52) U.S. Cl. .......................... 719/321; 710/15; 709/223
(58) Field of Classification Search ................ 719/318, 719/310, 321; 710/15; 709/223
See application file for complete search history.

(56) References Cited

U.S. PATENT DOCUMENTS

| | | | | |
|---|---|---|---|---|
| 5,201,027 | A * | 4/1993 | Casini | 358/1.7 |
| 5,764,546 | A * | 6/1998 | Bryant et al. | 702/108 |
| 5,778,328 | A * | 7/1998 | Trsar et al. | 701/29 |
| 5,926,775 | A * | 7/1999 | Brumley et al. | 702/127 |
| 6,614,916 | B2 * | 9/2003 | MacDonald | 382/101 |
| 6,689,319 | B1 * | 2/2004 | Fisher et al. | 422/67 |
| 2001/0047385 | A1 * | 11/2001 | Tuatini | 709/203 |
| 2003/0056018 | A1 | 3/2003 | Pike et al. | |
| 2004/0088349 | A1 * | 5/2004 | Beck et al. | 709/203 |

OTHER PUBLICATIONS

The Mathworks, "Matlab Central File exchange." Retrieved from Internet on May 9, 2004 .mathworks.com/matlabcentral/fileexchange/loadFile.do?objectId=247.
The Mathworks, "Data Acquisition Toolbox 2.2." Retrieved from Internet on Mar. 9, 2004 .mathworks.com/products/daq/.
The Mathworks, "Instrument Control Toolbox 1.2." Retrieved from Internet on Mar. 9, 2004 mathworks.com/products/instrument/.

* cited by examiner

*Primary Examiner*—Lechi Truong
(74) *Attorney, Agent, or Firm*—Lahive & Cockfield, LLP; Kevin J. Canning

(57) ABSTRACT

An image acquisition facility for linking a user of an application to an image acquisition device independent of an interface protocol of the image acquisition device. The image acquisition facility establishes a communication channel between the user and the image acquisition device and manages communication across the established channel. In this manner, the user of the application is free to select a desired image acquisition device for interfacing with and interacting with the selected image acquisition device independent of the interface bus standard, communication protocol and driver type supported by the selected image acquisition device.

38 Claims, 10 Drawing Sheets

METHOD OF PROVIDING CONSISTENT INTERFACE TO IMAGE ACQUISITION DEVICES

TECHNICAL FIELD OF THE INVENTION

The present invention generally relates to data processing and, more particularly, to tools and methods for interfacing with an image acquisition device.

BACKGROUND OF THE INVENTION

One of the difficulties that engineers and scientists often contend with when developing an image acquisition application is the need to interface and interact with a number of hardware and software components provided by a number of vendors. One purpose for developing an image acquisition application is to transfer an image or stream of images to a computer from an image acquisition device such as an image acquisition source or a video source to evaluate one or more properties of an object acquired in the images. The components to achieve such a task often depend on the requirements of the application. One such component is an image capture board.

The image capture board is a hardware component, such as a circuit card assembly, installed in the computer of the engineer or scientist developing the image acquisition application. The image capture board allows the computer to acquire an image or a stream of images from one or more image acquisition devices such as, a camera or video camera associated with the computer. The image capture board provides the capability to translate data in disparate formats between the image acquisition device and the computer so the two can communicate. Typical image capture boards provide a wide variety of features and are commonly referred to as analog or digital frame grabbers.

Unfortunately, there is no method amongst the various suppliers of image capture boards and image acquisition devices that defines a common communication format, protocol or technique for communications between such devices and a computer. Consequently, each vendor of an image capture board or image acquisition device provides a specific application program interface (API) for use by the computer and the computer user to access the features of the image capture board and in turn, the features of the image acquisition device. As a result, the various methods for interfacing with an image acquisition device are burdensome to the engineer or application developer often requiring multiple versions of an application, or multiple components within an application, each being specific to an image acquisition device supplier, in order to communicate with different image acquisition devices. This imposes an additional burden to the engineer or application developer in that the application the engineer or application developer creates, is specific to an image acquisition device supplier and cannot be reused to access other image acquisition devices from other suppliers without significant additional development.

Moreover, it is not uncommon that the interface for an image acquisition device requires the user to have knowledge of a programming language such as C or C++. Consequently, it is difficult for an engineer or application developer to develop an application for use amongst multiple image acquisition devices, such as image acquisition devices from multiple suppliers, and is further burdensome for the computer user or application user to switch between image acquisition devices or to install and initialize a new image acquisition device.

SUMMARY OF THE INVENTION

The illustrative embodiment of the present invention addresses the above described limitations of the conventional methods of interfacing with and interacting with an image acquisition device associated with a computer. The illustrative embodiment provides an approach that allows a user to interact with an image acquisition device independent of the supplier of the selected image acquisition device and independent of an interface bus protocol of the selected image acquisition device and independent of the acquisition technology of the selected image acquisition device.

The illustrative embodiment of the present invention provides an approach that establishes a communication channel between a user and an image acquisition device. The communication channel allows the user to interface with and interact with the image acquisition device independent of the supplier of the selected acquisition device and further independent of an interface bus protocol and independent of an image acquisition technology of the selected image acquisition device. In this manner, a user is able to configure a selected image acquisition device and initiate image acquisition without the need to have any knowledge of a lower level programming language or to have any knowledge of the interface of the selected image acquisition device.

In one aspect of the present invention a method is performed in an electronic device for accessing an image acquisition device independent of an interface protocol of the image acquisition device. The method includes steps of receiving a request from a requestor to access the image acquisition device and establishing a communication channel between the requestor and the image acquisition device independent of the interface protocol of the image acquisition device. Once the communication channel is established the requestor can access a feature of the image acquisition device using the communication channel. The request from the requestor is capable of specifying a format for a response from the image acquisition device.

The step of establishing can include steps of communicating with an interface of the image acquisition device to establish communication therewith and establishing one or more communication procedures between the requestor and the image acquisition device. The communication procedures provide instructions on how data transfers are managed between the requestor and the image acquisition device across the communication channel.

The one or more communication procedures provides instructions for logging data to a file, buffering data received from the image acquisition device, configuring selected properties of the image acquisition device or an interface associated with the image acquisition device, generating event based notifications, or translating error codes from the image acquisition device. The request from the requestor is receivable from a command line interface which can be an object based interface having methods and attributes.

In another aspect of the present invention, an electronic device associated with an image acquisition device for use in practicing a technical computing environment is disclosed. The technical computing environment is suited for developing and performing engineering and scientific related functions. The electronic device includes an input device for use by a user and an image acquisition mechanism responsive to inputs from the user to communicate with the image acquisition device in a manner independent of a communication protocol of the image acquisition device. The electronic device can further include a display device for viewing by the user. The image acquisition mechanism is capable of rendering a user interface on the display device to allow the user to provide the image acquisition with inputs using the input device.

The image acquisition mechanism includes an interface to receive the input from the user and an engine mechanism for managing communication between the user and the image acquisition device. The image acquisition mechanism further includes an adaptor mechanism adaptable to link the engine mechanism and an interface associated with the image acquisition device to establish communications between the image acquisition mechanism and the image acquisition device.

In yet another aspect of the present invention, a method is performed in an electronic device for communicating with an image acquisition device associated with the electronic device. The method interfaces a user of the electronic device with an image acquisition engine. The method further links the image acquisition engine and an interface of the selected image acquisition device using a communication channel operating independent of an interface protocol of the selected image acquisition device to allow the user to communicate with the selected device.

The method is further capable of associating the image acquisition device with a driver adapted for communicating with the interface of the selected image acquisition device. Additionally, the method is further capable of allowing a user to select the image acquisition device from a plurality of image acquisition devices associated with the electronic device.

The method is capable of instantiating the driver adapted for communicating with the interface of the image acquisition device. The method is further capable of abstracting an interface of the image acquisition device to allow the image acquisition device to communicate with the driver. Furthermore, the method is capable of allowing the user to trigger the image acquisition device on a selected event to acquire one or more images. The method can allow a user to preview one or more images from the image acquisition device before, during, or after triggering the image acquisition device to acquire one or more images.

The method is further capable of rendering on a display of the electronic device a user interface for use by the user for interfacing with the image acquisition engine. The method is capable of montaging one or more images acquired by the image acquisition device on a display device associated with the electronic device and capable of identifying a region of interest for an image acquired by the image acquisition device.

In another aspect of the present invention, a device readable medium holding device executable instructions for performing a method in an electronic device for accessing an image acquisition device independent of an interface protocol of the image acquisition device is disclosed. By accepting a request from a requestor to access the image acquisition device and creating a communication channel between the requestor and the image acquisition device that operates independent of the interface protocol of the image acquisition device, the requestor can access a feature of the image acquisition device using the communication channel.

In a further aspect of the present invention, a computer program product having instructions executable by a computer which, when executed by a processor of the computer allows a user of the computer to communicate with an image acquisition device associated with the electronic device. The executed instructions allow the electronic device to interface a user of the device with an image acquisition engine. The executed instructions further allow the electronic device to link the image acquisition engine and an interface of the selected image acquisition device using a communication channel operating independent of an interface protocol of the selected image acquisition device to allow the user to communicate with the selected device.

BRIEF DESCRIPTION OF THE DRAWINGS

An illustrative embodiment of the present invention will be described below relative to the following drawings.

DETAILED DESCRIPTION

Figure 1:
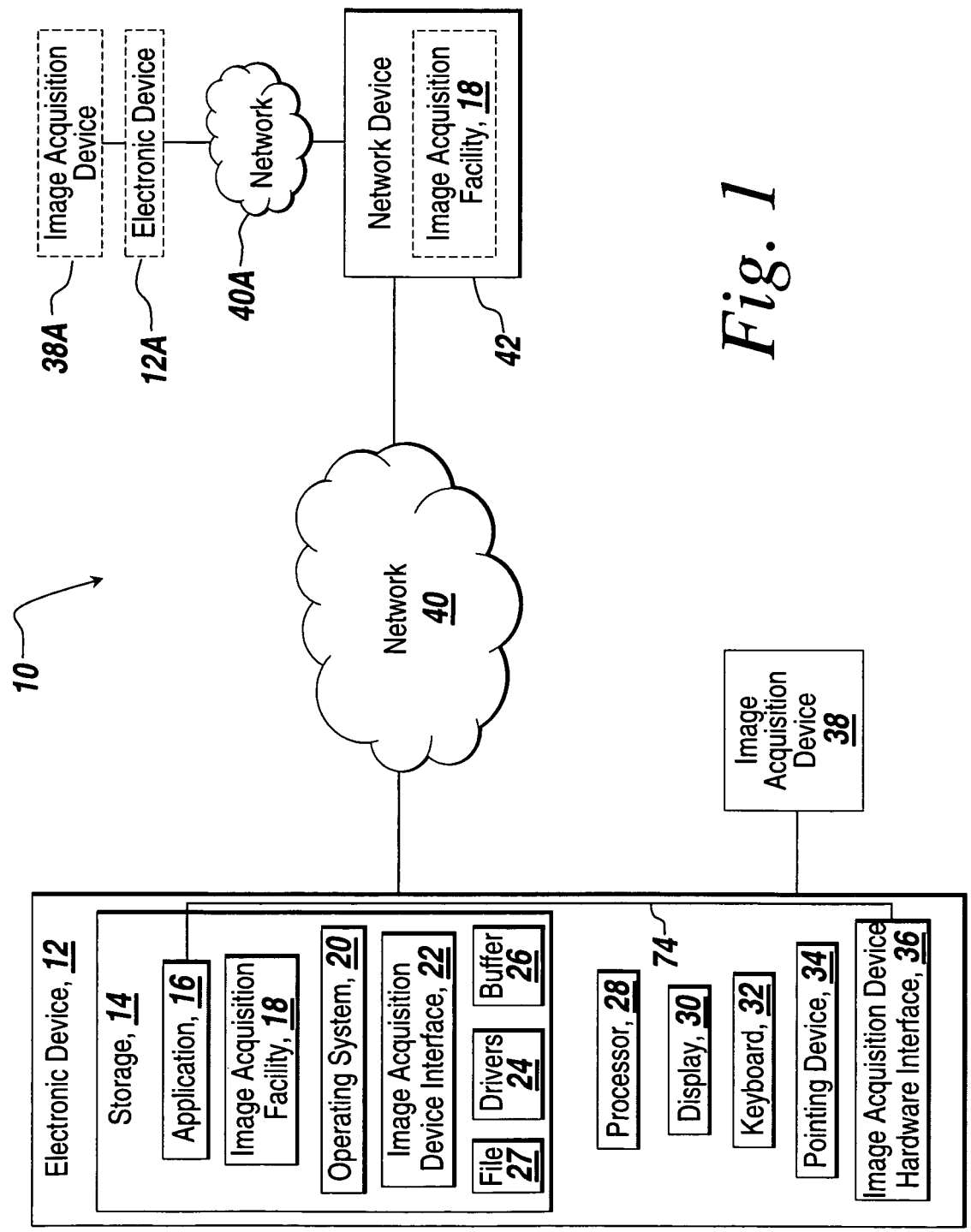
FIG. 1 is an exemplary block diagram illustrating an environment suitable for practicing the illustrative embodiment of the present invention.

The illustrative embodiment of the present invention provides a method and apparatus for establishing a communication channel between a user and an image acquisition device independent of the supplier of the image acquisition device, the image acquisition technology of the image acquisition device, and the interface protocol of the image acquisition device. The method and apparatus of the illustrative embodiment of the present invention allows a user to communicate with an image acquisition facility, which in turn, communicates with the image acquisition device to establish the communication channel. The image acquisition facility manages communication between the user and one or more hardware driver adaptors. A hardware driver adaptor links the image acquisition engine and a device driver that controls an image acquisition device. The image acquisition engine manages the communications over the communication channel between the user and the image acquisition device.

The hardware driver adaptors of the present invention are capable of supporting communications with image acquisition devices supplied from multiple suppliers and independent of an interface protocol of the image acquisition device. Moreover, each hardware driver adaptor of the present invention is capable of communicating with a number of operating systems to interface a user with a selected image acquisition device.

The method and apparatus of the present invention allows a user to access features of a selected image acquisition device via a user interface independent of the interface protocol of the selected image acquisition device. In this manner, a user without knowledge of the interface protocol of the selected image acquisition device is able to access a desired feature of the selected image acquisition device without having any knowledge of the device driver or interface, hardware or software, associated with the selected image acquisition device. Consequently, a user can use a set of commands and instructions provided from an application environment to access a variety of image acquisition devices without the need to have specific knowledge of the software or hardware interfaces associated with each of the various image acquisition devices.

Before continuing with the discussion below it is helpful to first define a few terms as used throughout the specification.

As used herein the term "interface protocol" or "interface format" refers to a set of rules for transmitting data and receiving data from an image acquisition device. The set of rules is capable of defining a data format for transferring data to or receiving data from an image acquisition device and is further capable of defining at least a type of error checking, if any, to be used for data transmissions; a data compression method, if any; how the sending mechanism will indicate that it has finished sending data; how the image acquisition device will indicate that it has received data.

As used herein the term "image acquisition device" refers to any device capable of acquiring or capturing an image of an object and provides a representation of the object. The image acquisition device can provide the representation of the object either alone or in association with one or more software components, one or more hardware components, or both, as a set of brightness values of pixels, color values of pixels, luminance values of pixels, electrical charge values of pixels, a set of instructions for reproducing the image of the object and the like. The image acquisition device can provide the representation of the object in an analog format or a digital format and can provide a single representation or a series of representations spanning a number of image captures or acquisitions.

FIG. 1 illustrates an environment suitable for practicing an illustrative embodiment of the present invention. A communication system 10 includes an electronic device 12, a network 40, such as the Internet or intranet, or other suitable network either wired, wireless, or a hybrid of wired and wireless, and a network device 42, such as a server, a bridge, a router, a switch, or other suitable network device. The electronic device 12 includes a microprocessor 28 for executing various instructions and programs, and controlling various hardware and software components. The electronic device 12 also includes a display device 30 for use in rendering textual and graphical images, a storage device 14 for storing various items such as an application 16, an image acquisition facility 18, an operating system 20, an image acquisition device interface 22, various peripheral drivers 24, a buffer 26, a file 27 and other data, information and programs.

The electronic device 12 also includes a keyboard 32 and a pointing device 34, such as a mouse, trackball, or lightpen. The electronic device 12 further includes an image acquisition device hardware interface 36 that communicates with image acquisition device 38 using a wired or wireless transmission medium. For the ease of the discussion below one image acquisition device 38 is discussed in relation to the electronic device 12. Nevertheless, those skilled in the art will recognize that the illustrative embodiment of the present invention is well suited for use with an electronic device 12 associated with more than one image acquisition devices.

For illustrative purposes, the application 16 is discussed below in terms of MATLAB® from the MathWorks, Inc. of Natick, Mass. Nevertheless, those skilled in the art will appreciate that the application 16 may be another application, such as, but not limited to a graphical programming environment or block diagram modeling tool.

The image acquisition facility 18 establishes and provides a communication channel 74 between a user of the application 16 and the image acquisition device hardware interface 36. The communication channel 74 allows a user of the application 16 to access one or more features or properties of the image acquisition device 38 or an interface associated with the image acquisition device 38 independent of a hardware bus type, standard or protocol; an interface type, standard, or protocol; an image acquisition device supplier; or an acquisition technology of the image acquisition device 38. In this manner, a user of the application 16 can communicate using the communication channel 74 with the image acquisition device 38 using a set of commands from the application 16 to interface with and interact with the image acquisition device 38 without having to adapt the application 16 to understand a format of the image acquisition device interface 22.

The network device 42 coupled to the network 40 is adaptable to include the image acquisition facility 18. In this manner, a number of users are able to access the image acquisition facility 18 via the network 40 without the need to have each user running a local copy of the image acquisition facility 18. Furthermore, the image acquisition facility 18 located on the network device 42 allows a user of the electronic device 12 to access an image acquisition device 38A associated with a second electronic device 12A via network 40A. In this manner, a remote image acquisition device can be accessed and controlled using a set of commands from the application 16 by establishing and providing a communication channel between the local user and the remote image acquisition device.

Those skilled in the art will recognize that the electronic device 12 includes other software such as other user interfaces and other programs, such as one or more OS programs, compilers and various other program applications developed in a variety of programming environments for controlling system software and hardware components.

The image acquisition device interface 22, the image acquisition device hardware interface 36 and the image acquisition device 38 are associated. That is, the image acquisition device interface 22 communicates with the image acquisition device hardware interface 36 to access and control the image acquisition device 38. In typical fashion, each image acquisition device 38 requires a specific image acquisition device hardware interface 36 and a specific image acquisition device interface 22 although this fact is not true for all image acquisition devices. For example, some image acquisition devices use the operating system 20 in place of the image acquisition device interface 22. Nonetheless, those skilled in the art will recognize that the concepts and principles described above and below are equally applicable to a unique software interface such as the image acquisition device interface 22 or to a software interface incorporated into the operating system 20. The image acquisition device hardware interface 36 includes one or more ports (not shown) to link the image acquisition device 38 to the electronic device 12. The image acquisition device hardware interface 36 includes other hardware components such as integrated circuits and is often referred to in the art as a frame grabber or image capture board.

Drivers 24 include local device drivers for interfacing with the display device 30, the keyboard 32, the pointing device 34 and other peripheral devices, such as one or more printers. Buffer 26 provides temporary storage for the application 16, the image acquisition facility 18 and/or any other program operated by the electronic device 12.

Application 16 provides the user of the electronic device 12 with a collection or set of functions, commands, controls and methods for configuring image acquisition properties associated with image acquisition device 38, for communicating with the image acquisition device 38, and to create units of code to access one or more features of the image acquisition device 38. The application 16 can be an object based programming language, a structured programming language or a hybrid programming language having object-oriented (OO) properties and structured properties such as C#. For the ease of the discussion below, the illustrative embodiment of the present invention is discussed in accordance with the concepts and principles of classes in an object-oriented framework. Nevertheless, those skilled in the art will recognize that the illustrative concepts discussed herein are applicable to other programming frameworks such as structured programming frameworks including C, Fortran and the like, or hybrid programming frameworks having OO Properties and structured properties such as C#. The application 16 provides the user access to a set of functions, commands, methods, and controls for interfacing with and interacting with an image acquisition device.

Figure 2:
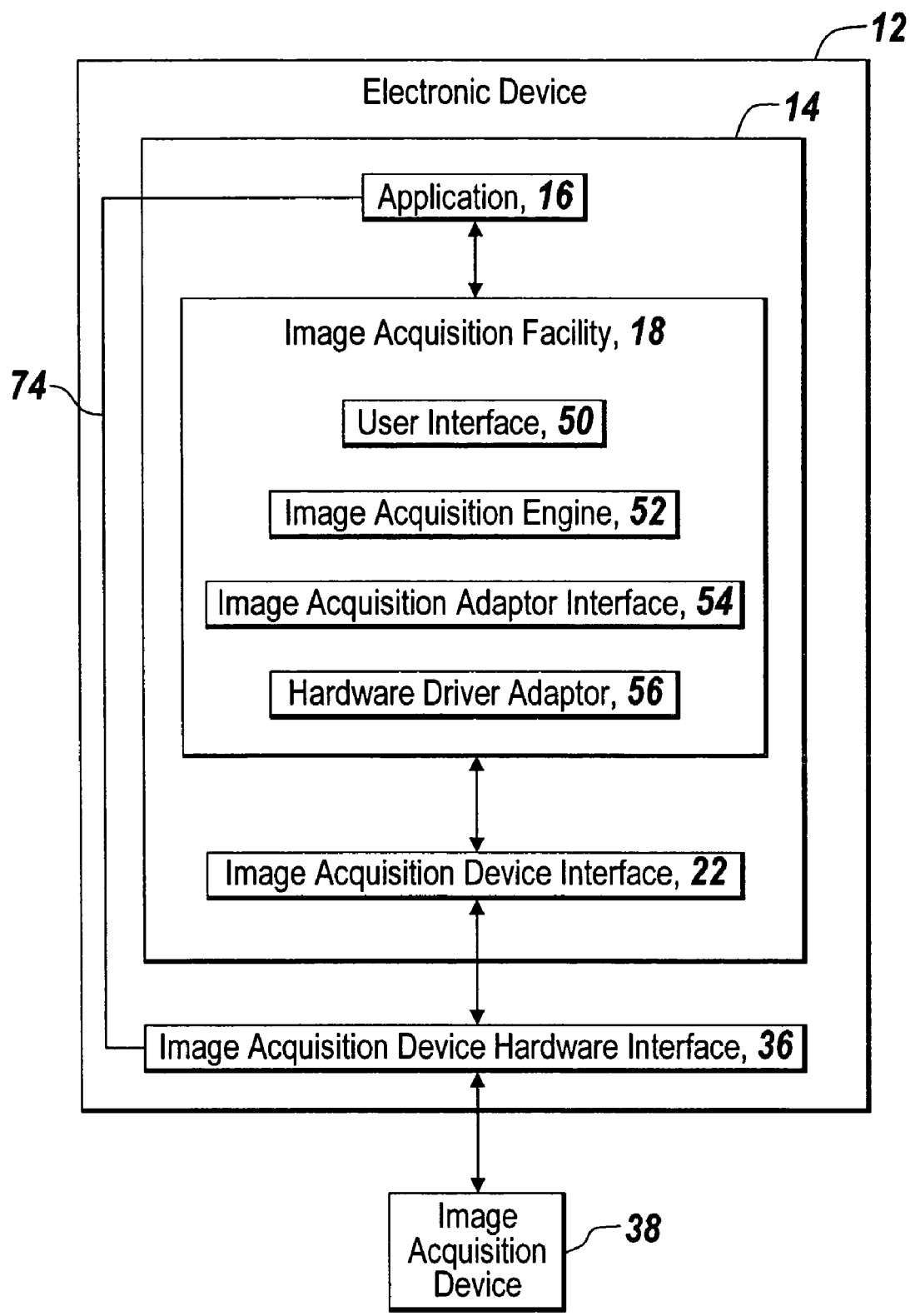
FIG. 2 is an exemplary block diagram illustrating an exemplary image acquisition facility suitable for practicing the illustrative embodiment of the present invention.

FIG. 2 illustrates the image acquisition facility 18 in more detail. Image acquisition facility 18 includes a user interface 50, an image acquisition engine 52, an image acquisition adaptor interface 54, and a hardware driver adaptor 56.

User interface 50 is defined by the set of functions, commands, methods, controls, and properties provided by the application 16 for interfacing with and interacting with the image acquisition device 38. The image acquisition engine 52 is responsible for managing data transfers between the image acquisition device 38 and application 16. In practice, the image acquisition facility 18 allows a user of application 16 to access data, for example live images fed from the image acquisition device 38 using functions and methods defined in the application 16. In the description below user interface 50 and image acquisition engine 52 are discussed as distinct entities, nonetheless those skilled in the art will appreciate that the user interface 50 and the image acquisition engine 52 are implementable as a single entity.

The image acquisition engine 52 is further responsible for formatting the data provided by the image acquisition device 38 into a format understandable by the application 16. In this manner, the user can request a specific format for the data from the image acquisition device 38. The image acquisition engine 52 can interface with an image acquisition input object 100, illustrated in FIG. 6 and discussed below in more detail, to determine a communication protocol defining how the data is transferred between the image acquisition device 38 and the application 16.

The image acquisition device 38 with which the image acquisition engine 52 communicates is dependent on the image acquisition adaptor interface 54 chosen by the user when the image acquisition input object 100 is created. The image acquisition engine 52 is further capable of logging data to file 27, buffering data received from the image acquisition device 38 to buffer 26, configuring properties of the image acquisition device 38 or an interface associated with the image acquisition device 38, generating events, and translating error codes generated by the image acquisition device 38, the image acquisition device hardware interface 36, and the image acquisition device interface 22. The image acquisition engine 52 is capable of logging data to file 27 and buffering data in buffer 26 simultaneously. The image acquisition engine 52 is further capable of logging image data to file 27 as a background operation while the user views live images from the image acquisition device 38 or to buffer data to file 27 or buffer data in buffer 26 as a background operation while the user views live images from the image acquisition device 38. The image acquisition engine 52 is capable of providing a preview window 126, which is discussed below in more detail with reference to FIG. 7, to allow a user to view live image data from the image acquisition device 38 while simultaneously logging image data to file 27, buffering data to file 27 or buffer or other memory structure if so desired by the user.

Those skilled in the art will recognize that the logging or buffering of data is considered a type of memory write operation. Furthermore, those skilled in the art will recognize that in addition to data logging to file 27 and data buffering to a buffer the image acquisition facility 18 is capable of sending image data to other data sinks capable of accepting such data, for example, a preview window, a user interface, a database, and the like, for storing image data.

The image acquisition engine 52 communicates through the image acquisition adaptor interface 54 to the hardware driver adaptor 56 in order to allow the image acquisition engine 52 to communicate with the image acquisition device interface 22 or an interface driver built into the operating system 20 and, in turn, the image acquisition device 38. The image acquisition facility 18 is capable of including more than one hardware driver adaptor 56 because one skilled in the art will readily recognize that typically a supplier provided image acquisition device 38 and a supplier provided image acquisition device hardware interface 36 are supplier specific components having a distinct communication protocol and hence requiring a hardware driver adaptor 56 adapted to the distinct communication protocol to enable the image acquisition engine 52 to communicate with a selected image acquisition device 38. As such, it is possible to have a hardware driver adaptor 56 for each image acquisition device 38 associated with the electronic device 12. The hardware driver adapter 56 and image acquisition adaptor interface 54 are described below in more detail. Nevertheless, those skilled in the art will recognize that image acquisition facility 18 can include more than one image acquisition interface 54 so that each unique hardware driver adaptor 56 is associated with a specific image acquisition interface 54. However, those skilled in the art will recognize that the image acquisition facility 18 can have a single image acquisition interface 54 that interfaces with multiple hardware driver adaptors.

The image acquisition adaptor interface 54 is an interface used by the image acquisition engine 52 to access the hardware driver adaptor 56 and communicate with a selected image acquisition device, for example, image acquisition device 38. The image acquisition adapter interface 54 allows image acquisition engine 52, and, in turn, the user of application 16 to communicate with a selected image acquisition device independent of any interface protocol, image acquisition technology, or supplier of the image acquisition device 38. The hardware driver adaptor 56 assists in creating an abstraction of information specific to a selected image acquisition device, for example image acquisition device 38. The abstracted data is used by the image acquisition facility 18 to create one or more objects, such as an image acquisition input object 100 or an image acquisition source device object 102. The abstraction of information by the hardware driver adaptor 56 is discussed below in more detail with regard to FIG. 3. The image acquisition input object 100 and the image acquisition source device object 102 are discussed below in more detail with regard to FIG. 5.

The image acquisition facility 18 using the user interface 50, the image acquisition engine 52, the image acquisition adaptor interface 54, and the hardware driver adaptor 56 establishes and provides a communication channel 74 between the application 16 and the image acquisition device hardware interface 36. Thus, the communication channel 74 operates in a manner independent of an interface type and protocol, an image acquisition technology, and supplier of the image acquisition device thus allowing the user of application 16 to interface with and interact with the image acquisition device 38 using a set of functions, methods, controls and commands provided by application 16. In this manner, the user of application 16 requires little if any knowledge of a format or communication protocol required by the image acquisition device 38. Hence, the user can beneficially access a desired image acquisition device without the need to learn an additional set of functions, methods, controls or commands and without having to create code to interface with and interact with the selected image acquisition device.

Figure 7:
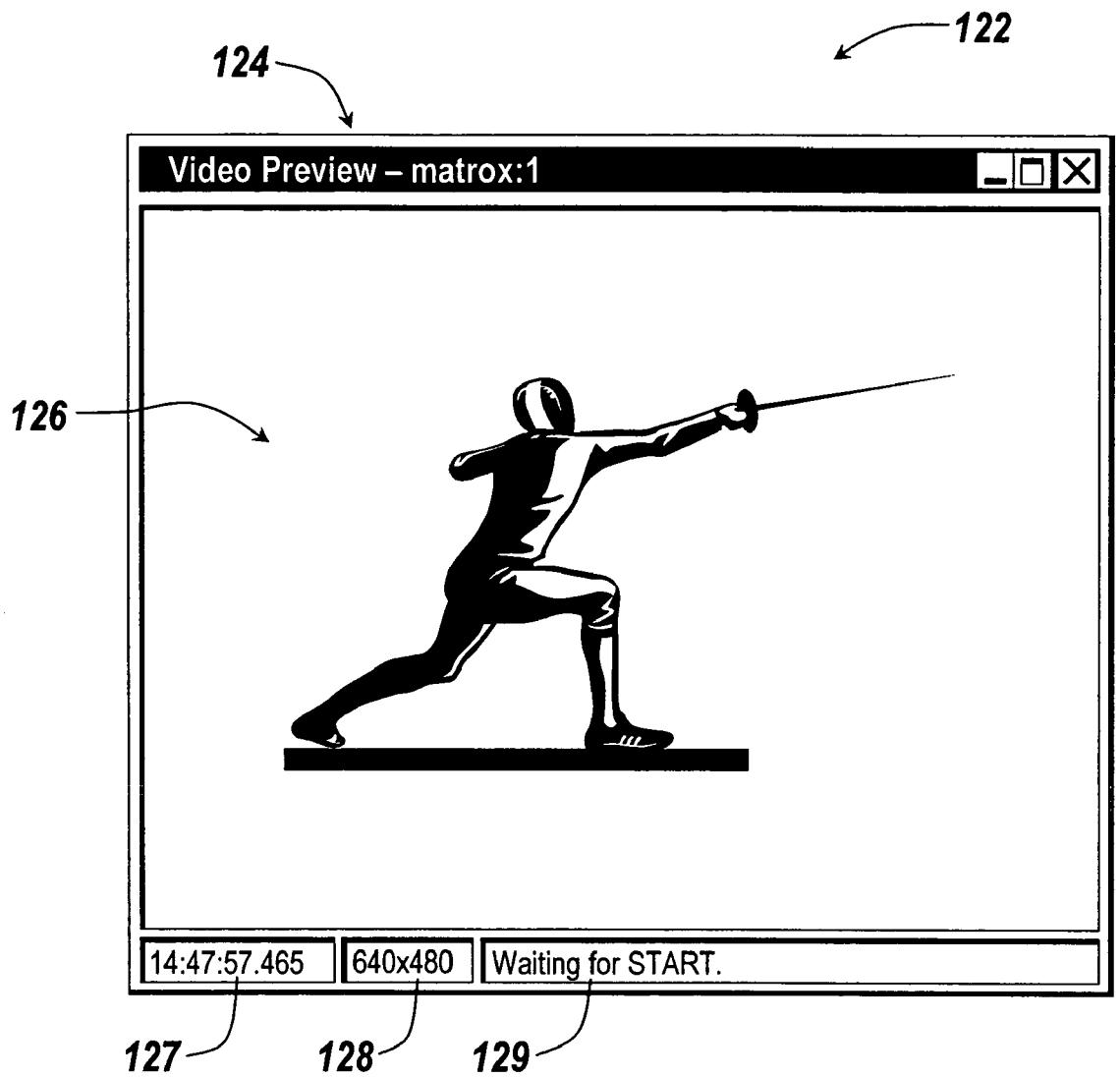
FIG. 7 is an exemplary screen shot depicting an Image Preview in accordance with the illustrative embodiment of the present invention.

The image acquisition facility 18 in addition to transferring commands and requests from the application 16 across the communication channel 74 to the image acquisition device 38 and transferring image data from the image acquisition device 38 across the communication channel 74 to the application 16 is capable of transferring metadata on the image data, concurrently therewith or subsequent thereto, across the communication channel 74 to the application 16 or to another suitable software or hardware mechanism, such as preview window 126. In this manner the image acquisition facility 18 transfers metadata on each image, frame, such as a frame timestamp and a frame count. For example, a frame count can be an absolute count (i.e. the frame is the Nth frame of an acquisition) or a relative frame count (i.e. the Nth frame within the Mth trigger). FIG. 7 illustrates one exemplary use of metadata associated with image frames provided by the image acquisition facility 18, by using the frame's associated timestamp as part of the preview window.

The image acquisition facility 18 is capable of providing the application 16 a variety of numerical data types, for example, four bit signed or unsigned integers, eight bit signed or unsigned integers, sixteen bit signed or unsigned integers, thirty-two bit signed or unsigned integers, single and double precision values, and the like. Those skilled in the art will recognize that the image acquisition facility 18 is adaptable to provide the application 16 numerical data in any data type requested by the user and supported by the application 16. In one embodiment of the present invention, the image acquisition facility 18 provides data to the application 16 using the smallest numerical data type that preserves the numerical integrity of the data being transferred.

Figure 3:
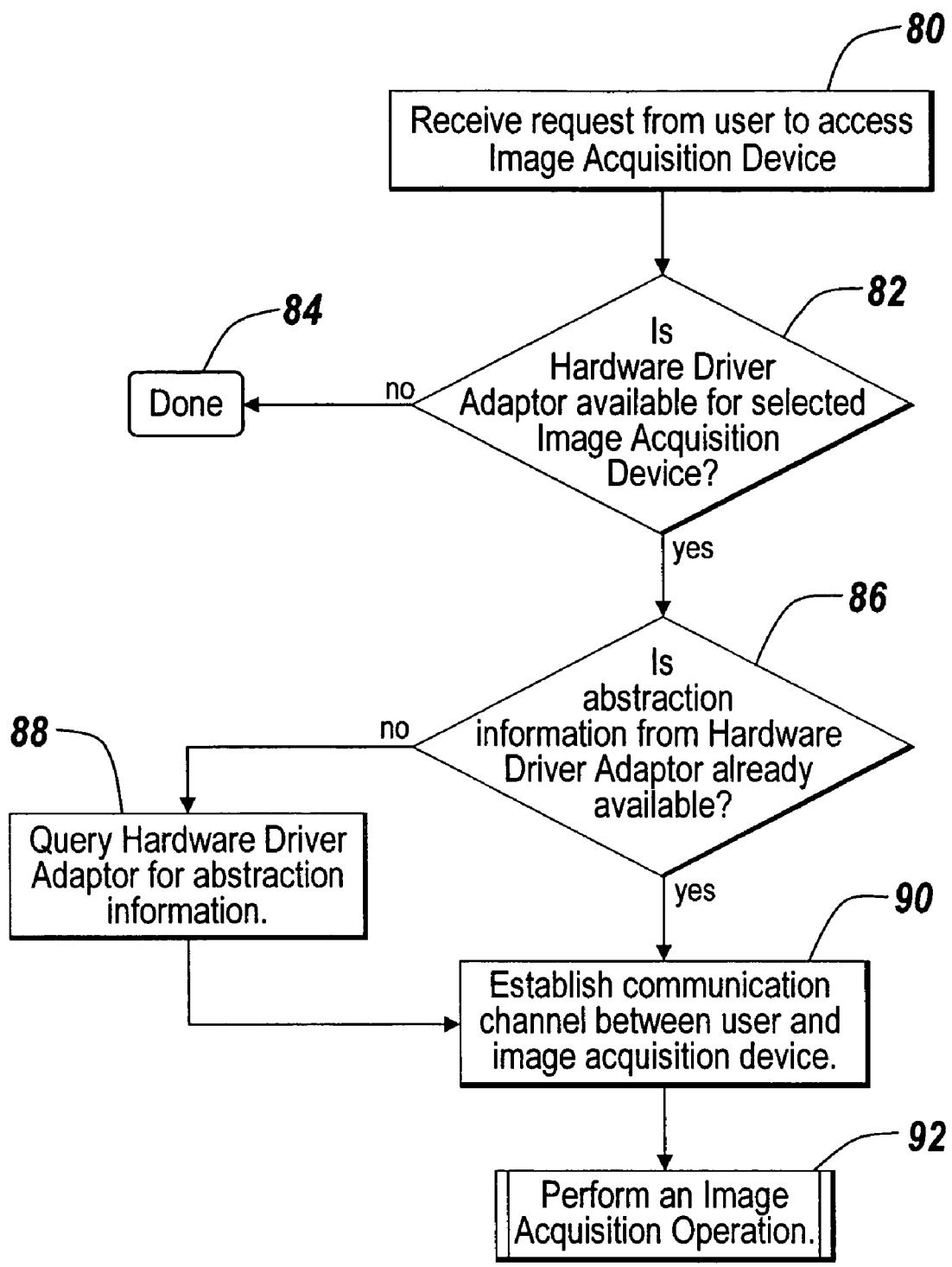
FIG. 3 is an exemplary flow chart that provides an overview of steps taken to practice the illustrative embodiment of the present invention.

FIG. 3 illustrates operation of the image acquisition facility 18 in more detail. In step 80, the image acquisition facility 18 receives a request from the user to access a selected image acquisition device. In turn, the image acquisition engine 52 searches a directory, or other suitable data structure such as a file or look up table for an available hardware driver adaptor 56 suitable for the selected image acquisition device. The search for available hardware driver adaptors can be performed once when the user first requests access to image acquisition device 38, the results of which can be stored in a storage device or in a suitable storage medium. Nevertheless, the image acquisition facility 18 is adaptable so that each time the user requests access to image acquisition device 38 a new search is performed for available hardware driver adaptors in the event that a new or revised hardware driver adaptor is available. For the purpose of the discussion of the illustrative embodiment of the present invention, information on available hardware driver adaptors is stored after an initial search. The image acquisition engine 52 can initialize all available hardware driver adaptors or initialize a selected one or more hardware driver adaptors suitable for use with the selected image acquisition device. Each initialized hardware driver adaptor 56 provides some form of an indication, such as a Boolean return value, to the image acquisition engine 52 to indicate completion or failure of initialization. The image acquisition engine 52 upon receipt of all values from the initialized hardware driver adapters returns a list of available hardware driver adaptors that were successfully initiated to the application 16.

In step 82, if the hardware driver adaptor 56 is available for the selected image acquisition device 38 then in step 86 it is determined if the hardware driver adaptor 56 has already abstracted information concerning the image acquisition device and if that information is available, for example, is there a file, a class definition, or object that contains the abstracted information. If the information is not available in step 88, the application 16 through the user interface 50 directs the image acquisition engine 52 to call or query the hardware driver adaptor 56 to find all image acquisition devices available through the selected hardware driver adaptor 56. As such, the image acquisition engine 52 calls the hardware driver adaptor 56 through the image acquisition adaptor interface 54 and the hardware driver adaptor 56 returns to the application 16 a list image acquisition devices available through the selected hardware driver adaptor 56. Those skilled in the art will recognize that a hardware driver adaptor 56 and an image acquisition device 38 are capable of having a one to one relationship so that a selected hardware driver adaptor must be used to communicate with a selected image acquisition device. Nevertheless, those skilled in the art will further recognize that a hardware driver adaptor is capable of communicating with multiple image acquisition devices so long as each image acquisition device has similar methods of communication. If it is determined that no hardware driver adaptor 56 is available in step 82, then in step 84 the image acquisition facility 18 ends the process of establishing the communication channel 74.

Further in step 88, the application 16 queries selected hardware driver adaptor 56 for properties, functions, and information of the selected image acquisition device or an interface associated with the image acquisition device. In turn, the hardware driver adaptor 56 is able to abstract the requested information from the image acquisition device interface 22, the image acquisition device hardware interface 36 or the image acquisition device 38 as necessary and return to the image acquisition engine 52 source, functions, and property information for the selected image acquisition device or an interface associated with the selected image acquisition device. The hardware driver adaptor 56 is also capable of returning a template having the appropriate values in the appropriate fields or returning one or more objects that include the appropriate source and property information for the selected image acquisition device or an interface associated with the selected image acquisition device. Further, the hardware driver adaptor 56 is capable of updating a file or object with data specific to a selected image acquisition device 38.

If the hardware driver adaptor 56 returns one or more objects, the image acquisition engine 52 requests the hardware driver adaptor 56 to instantiate an object that includes the attributes and methods for the selected image acquisition device. The hardware driver adaptor 56 instantiates such an object and creates a handle to the object that is returned to the hardware driver adaptor 56 for inclusion in an image acquisition input object 100 for use by the application 16 and the image acquisition engine 52 to communicate with the selected image acquisition device 38. For example, the image acquisition engine 52 upon receipt of the handle from the hardware driver adaptor 56 can call a constructor that creates the image acquisition input object 100. The constructor using the provided handle can configure the proportions of the image acquisition input object 100 to correspond to selected constructor arguments, for example, device ID=1 and video format=NTSC.

To facilitate abstraction of image acquisition device information by the hardware driver adaptor 56 that concerns the image acquisition device 38 the image acquisition facility 18 can provide a read mechanism to assist in creating the image acquisition input object 100 or the image acquisition source device object 102. In one embodiment of the present invention the read mechanism is a file that contains property information for the image acquisition device 38 or an interface associated with the image acquisition device 38. Such property information includes, but is not limited to a property name, property type, property constraints, help information and other like information concerning the image acquisition device 38 that the hardware driver adaptor 56 or the image acquisition engine 52 can read in and create an image acquisition input object 100 or an image acquisition source device object 102. Those skilled in the art will recognize that the read mechanism is not limited to property information for the image acquisition device 38 or an interface associated with the image acquisition device 38, but can include functions and other information, such as trigger information specific to a selected image acquisition device, or an interface associated with the image acquisition device 38 or information needed to abstract the image acquisition adaptor interface 54. In one embodiment of the present invention, the read mechanism is structured as a markup language file.

The image acquisition engine 52 or the hardware driver adaptor 56, or both are capable of providing a help feature to the user through the user interface 50. The help feature provides the user with information on the image acquisition device properties abstracted by the image acquisition engine 52 or the hardware driver adaptor 56, or both to create the image acquisition adaptor interface 54. This information provides additional details on a selected property, such as a valid range of values, default values and the like. The help feature is considered a dynamic help feature because the provided information is collected and provided by the image acquisition engine 52 or the hardware driver adaptor 56, or both, when request for such information is received. Nevertheless, those skilled in the art will recognize that the help feature is adaptable to include a suitable file to which the image acquisition engine 52 or the hardware driver adaptor 56, or both, write the property information to so that when a request for help is received the property information is already collected and is readable from the file. Furthermore, those skilled in the art will appreciate that the help feature is configurable to provide a user with additional information concerning one or more functions of a selected image acquisition device 38.

In step 90, the image acquisition facility 18 establishes the communication channel 74 between application 16 and the image acquisition device 38. That is, a start method from the application 16 calls the start method of the image acquisition engine 52. In turn, the start method of the image acquisition engine 52 calls the corresponding method of the hardware driver adaptor 56. The corresponding method of the hardware driver adaptor 56 communicates with the image acquisition device interface 22, which communicates with the image acquisition device hardware interface 36, and in turn, the image acquisition device 38 and establishes a connection or communication channel 74 between the application 16 and the image acquisition hardware interface 36.

For example, an image acquisition device hardware interface provided by MATROX Graphics Inc. of Quebec, Canada includes an "open device" method. As such, the start method of the image acquisition engine 52 calls the open device method of the hardware driver adaptor 56 associated with the MATROX image acquisition device hardware interface. The hardware driver adaptor 56 for the MATROX image acquisition device hardware interface, in turn, communicates with the MATROX image acquisition device interface which communicates through the MATROX image acquisition device hardware interface to the image acquisition device and establishes a connection. In step 92, the user of application 16 accesses a feature or property of the image acquisition engine 18 using the user interface 50.

To access image data, the user through the user interface 50 instructs the application 16 to request image frames from the image acquisition engine 52 by invoking the appropriate method to get data. If data is available, the image acquisition engine 52 accesses the available image frames and extracts the image frames needed to return to the user. If no data is available, the image acquisition engine 52 repeatedly checks until enough data is available or until a specified event occurs, such as a time out. If the image acquisition device 38 is unable to perform the request provided by the hardware driver adaptor 56 the image acquisition device interface 22 returns an error code. The error code is translated by the hardware driver adaptor 56 into an error message or another error code understandable by the image acquisition engine 52 and is passed thereto. The image acquisition engine 52 thereby provides the error message to the application 16 in a format understandable by application 16.

Those skilled in the art will recognize that depending on the selected image acquisition device and the capabilities of the selected image acquisition device the image acquisition facility 18 can offer multiple threads or multiple communication channels between the application 16 and the selected acquisition device 38 or between the application 16 and multiple selected image acquisition devices.

Figure 4:
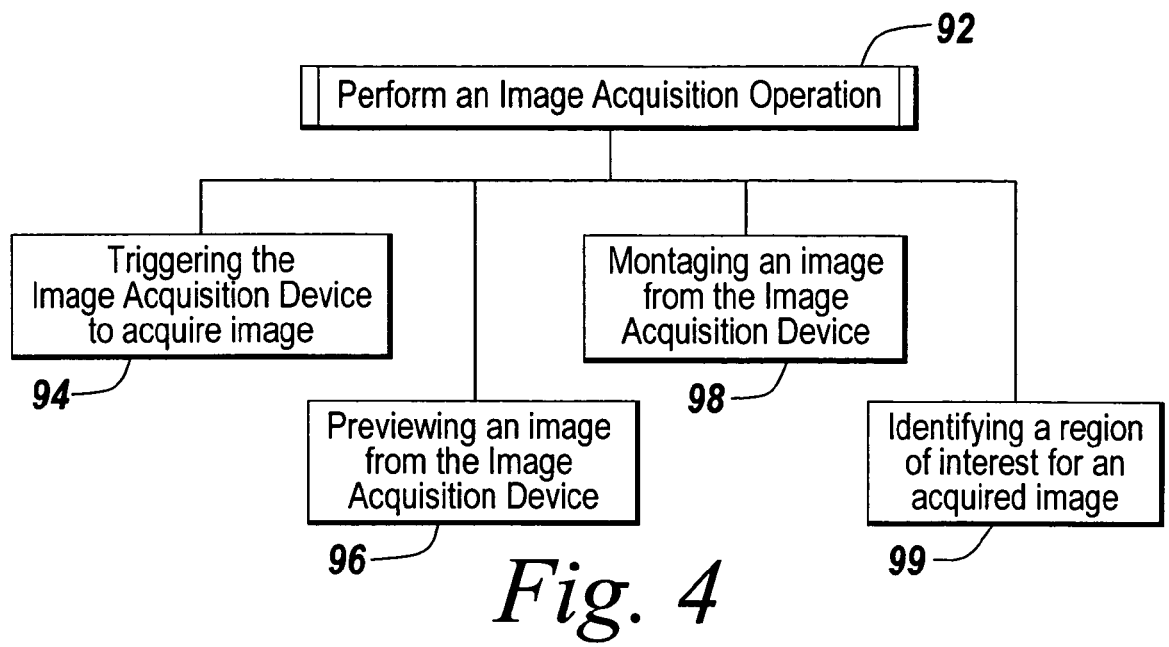
FIG. 4 is a more detailed flow diagram illustrating a portion of the steps illustrated in FIG. 3 in more detail.

FIG. 4 illustrates step 92 of FIG. 3 in more detail. Once the communication channel 74 is established between application 16 and the image acquisition device hardware interface 36 the user of application 16 can access a feature of the image acquisition device 38 or a feature of the image acquisition facility 18. In step 94, the user through a command, method, feature, control of the application 16 triggers the image acquisition facility 18 to begin acquiring one or more images. A more detailed discussion of various triggering options available to the user is discussed below in more detail with regard to FIGS. 10, 11, and 12.

Figure 8:
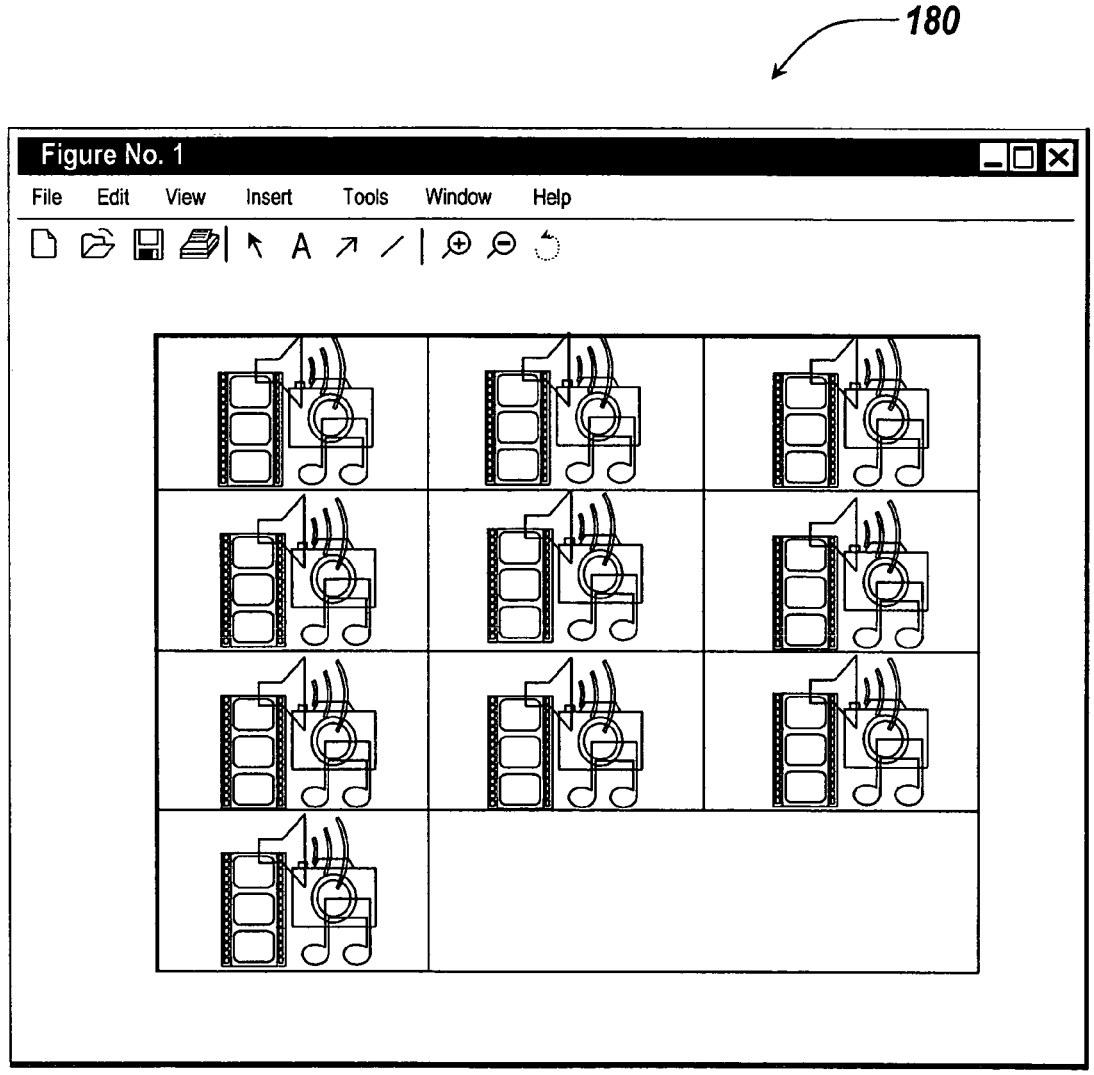
FIG. 8 illustrates an exemplary window that depicts a montage of images in accordance with the illustrative embodiment of the present invention.

In addition, in step 96, the user of application 16 using the communication channel 74 accesses a feature of the image acquisition facility 18 to preview an image from the image acquisition device 38. An exemplary preview window is illustrated in FIG. 7 and is discussed in more detail below. In similar fashion, in step 98 the user of application 16 using the communication channel 74 can request the image acquisition facility 18 to montage one or more images acquired by the image acquisition device 38. FIG. 8, which is discussed below in more detail, depicts an exemplary montaging of images from the image acquisition device 38. In step 99, the user of application 16 can access a feature of the image acquisition facility 18 or the image acquisition device 38 if capable of refining an image to provide a region of interest, using communication channel 74 to identify a region of interest for an acquired image. FIG. 10 depicts an exemplary region of interest for an acquired image. The region of interest feature is discussed below in more detail with reference to FIG. 9.

Figure 5:
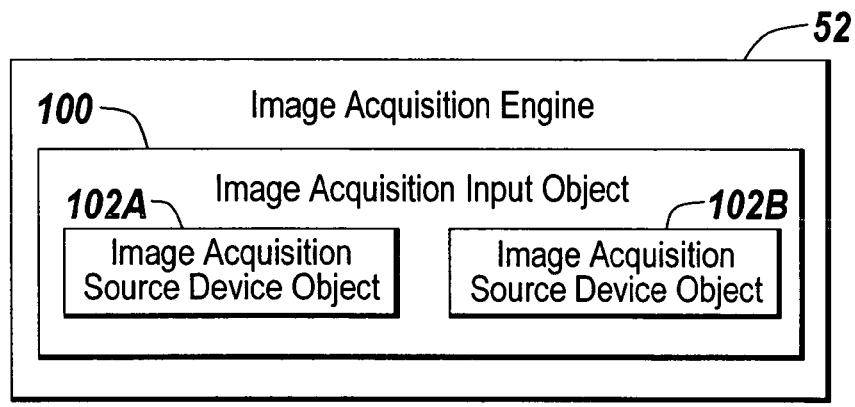
FIG. 5 illustrates the Image Acquisition Engine of the exemplary Image Acquisition Facility in more detail.

FIG. 5 illustrates the image acquisition engine 52 in more detail. In the illustrative embodiment of the present invention, the image acquisition engine 52 includes an OO framework that includes an image acquisition input object 100. The image acquisition input object 100 provides a high level representation of the communication channel 74 between the application 16 and a specific image acquisition device, for example, image acquisition device 38. The image acquisition input object 100 provides properties for one or more image acquisition devices or for one or more interfaces associated with the image acquisition device 38 for controlling various aspects of the image acquisition process, such as the amount of image data to capture. The image acquisition input object 100 further provides access to configuration settings for one or more image acquisition devices, such as triggers and color space. Those skilled in the art will appreciate that the image acquisition facility 18 is configurable to perform color space conversions between one or more color spaces to satisfy a user's request. For example, the image acquisition facility 18 is configurable to convert Red, Green, Blue, (RGB) color information to Monochrome grayscale information, Cyber color information, YUV color information, or other like color conversions.

The image acquisition input object 100 is further capable of providing a collection of methods, for one or more image acquisition devices for enabling the image acquisition process, such as methods for reviewing image data from the image acquisition device and initiating the streaming of data across the communication channel 74 to the application 16. One list of these properties and methods is available in the Image Acquisition Toolbox User Guide provided by the MathWorks, Inca of Natick, Mass. Those skilled in the art will appreciate that within the MATLAB® environment provided by MathWorks, Inc. of Natick, Mass., a MATLAB M file is configurable such that when the M file is executed the image acquisition input object 100 is recreated with the configurations it had when the M file was called. In this manner a user is able to capture the state of their configuration settings for later use without having to reconfigure all their settings manually. Furthermore, the execution of a file or other executable means to recreate configuration settings allows a user to readily generate a function that recreates a pre-configured object suitable to their needs. The generated function can then be integrated into an application. Nevertheless, those skilled in the art will appreciate that other executable files are creatable in other software environments to recreate an image acquisition input object with configuration settings when the executable file is called.

The image acquisition input object 100 includes inputs such as a name given to an associated hardware driver adaptor 56, a unique image acquisition device identifier, a video format for images acquired by the image acquisition device and other like inputs. The hardware driver adaptor name input is a term used to describe the hardware driver adaptor 56 that manages the communication between the image acquisition device 38 and the image acquisition engine 52. The unique acquisition device identifier is set to an available identifier by the image acquisition engine 52 if one is not provided. The video format input defaults to an available video format if a video format is not provided. The video format is specifiable as a name of a video format supported by the image acquisition device or a path to a configuration file associated with the image acquisition device 38.

The image acquisition input object 100 is associated with the image acquisition device uniquely identified by the inputs of the image acquisition object 100. For example, vid=videoinput ("MATROX", 1, "RS170"); vid=videoinput ("MATROX", 1, "D:/cameras/pulnix.dcf"). The related video input object properties represent the device ID, the image acquisition device name, and the video format or configuration file used for the image acquisition device 38.

Figure 6:
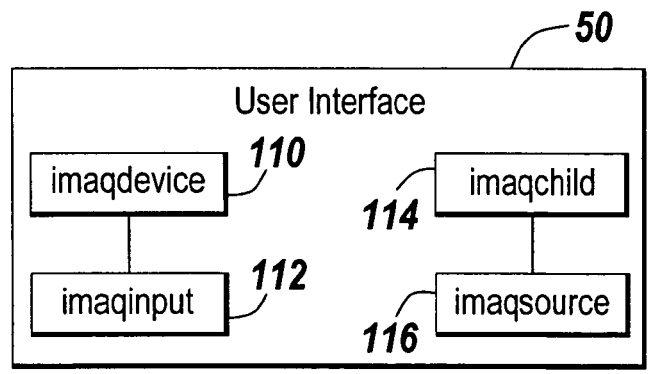
FIG. 6 illustrates a user interface of the exemplary Image Acquisition Facility in more detail.

Properties of the image acquisition input object 100 include logging to indicate whether the image acquisition facility 18 is logging data from the image acquisition device 38, running to indicate the state of the image acquisition device 38, selected source name to identify a name of the selected image acquisition device and a source input to identify the name of an available image acquisition device source object 102. Those skilled in the art will appreciate that the image acquisition facility 18 is adaptable ability to package data into frame buffers and provided to a destination that can be shared across multiple data sinks. One suitable method for packaging data into frame buffers is described in U.S. patent application Ser. No. 10/671,703, entitled Object Oriented Data Transfer System For Data Sharing, which is incorporated herein. Upon the creation of an image acquisition input object 100, the image acquisition engine 52 automatically creates one or more image acquisition source device objects 102A and 102B that are associated with the image acquisition input object 100. The number of image acquisition source device objects created by the image acquisition engine 52 depends on the image acquisition device associated with the image acquisition input object 100 and the video format specified by the user when the image acquisition input object is created. As illustrated in FIG. 6, the image acquisition input object 100 acts as a container for one or more image acquisition source device objects 102A and 102B.

An image acquisition source device object represents a collection of one or more physical data sources that are treated by the image acquisition facility 18 as a single entity. In operation, one of the image acquisition source device objects is selected and the image acquisition facility 18 refers to the selected image acquisition source device object as the selected source. Nevertheless, those skilled in the art will recognize that more than one image acquisition source device is selectable by the image acquisition facility 18 at any one time. The selected image acquisition source device object acts as a data source for acquiring data. The image acquisition facility 18 selects one of the image acquisition source device objects by default when an image acquisition input object 100 is created.

Each image acquisition source device object 102A and 102B provides properties common to a number of image acquisition devices or an interface associated with the image acquisition devices, for example, properties that provide general source information and provides properties specific to the selected image acquisition device or an interface specifically associated with the selected image acquisition device. Examples of properties specific to the selected image acquisition device include control aspects of the image acquisition device such as by configuration of the image acquisition device, and modification of characteristics of the data to be acquired, for example image brightness.

To illustrate the creation of one or more image acquisition source device objects 102A and 102B take for example, an image acquisition device hardware interface 36 provided by MATROX Graphics, Inc. of Quebec, Canada. One such MATROX image acquisition device hardware interface supports eight physical connections or channels and is configurable in various ways depending on the video format. For example, if the user specifies a monochrome video format, such as RS170, the image acquisition facility 18 creates eight image acquisition source device objects 102A through 102H, one object for each of the eight channels of the MATROX image acquisition device hardware interface. In another example, if the user of application 16 specifies a color video format, such as NTSC RGB, the MATROX image acquisition device hardware interface uses three channels to represent one RGB connection, where each channel provides one data type, for example, one channel for red data, one channel for green data, and one channel for blue data. In this instance, the MATROX image acquisition device hardware interface can configure the eight channels to acquire from at most two distinct RGB image acquisition devices. Therefore, the image acquisition facility 18 creates two image acquisition source device objects 102A and 102B for the MATROX image acquisition device hardware interface. Each image acquisition source device object is thereby associated with an image acquisition device 38 accessible by the image acquisition device hardware interface 36.

Those skilled in the art will recognize that the image acquisition facility 18 is capable of combining a number of image acquisition input objects, a number of image acquisition source device objects, or both into an array of objects. In this manner, the image acquisition facility 18 allows the user of application 16 to operate on an array of image acquisition objects and hence, provide the user with additional degrees of freedom to configure object properties, manipulate the properties, and control the behavior of various image acquisition devices or an interface associated with one or more of the various image acquisition devices.

The image acquisition facility 18 is capable of providing a user with a graphical property configuration tool to allow the user to configure properties of an image acquisition input object 100 or an image acquisition source device object 102. In this manner the image acquisition facility 18 generates a graphical tool accessible to the user that lists all properties for a selected image acquisition input object 100 or an image acquisition source device object 102 and further displays the current values of those properties. The graphical tool allows the user to modify the values of those displayed properties.

FIG. 6 illustrates an illustrative object schema suitable for implementing the user interface 50 in more detail. In the illustrative embodiment of the present invention, the user interface 50 is implementable as a command line interface (CLI), as a graphical user interface (GUI), or as a menu driven interface. One example of an application environment suitable for use with the illustrative user interface is MATLAB M offered by MathWorks, Inc. of Natick, Mass. Another, example of an application suitable for use with the illustrative user interface is Simulink® offered by MathWorks, Inc. of Natick, Mass. Other applications suitable for use with the illustrative user interface include, but are not limited to Lab-View, System View, Signal Processing Workstation, Hyper-Signal, COSSAP, Angeles, Ptolemy and other like graphical modeling environments. In one aspect of the present invention, application 16 provides a collection of functions, commands, and methods available to the user to create image acquisition input objects 100 and image acquisition source device objects 102A and 102B, configure image acquisition object properties, and communicate with a desired image acquisition device. In this aspect of the present invention, the functions, methods, objects, and properties of the application 16 define the user interface for the user.

In the illustrative embodiment of the present invention, the user interface 50 uses an image acquisition device object 110, an image acquisition input object 112, an image acquisition child object 114, and an image acquisition source object 116. The image acquisition device object 110 includes methods and properties inherited by an image acquisition input object 100. The image acquisition input object 100 includes methods and properties for acquiring an image with image acquisition device 38. The image acquisition child object 114 includes methods and properties inherited by an image acquisition source device object 102A. The image acquisition source device object 102A includes methods and properties to access image acquisition device 38. In this manner, the user of application 16 interacts with the image acquisition input objects 100 and one or more image acquisition source device objects 102A and 102B through the user interface 50. As such a user of application 16 can interface with and interact with a desired image acquisition device regardless of an interface protocol required by the selected image acquisition device. In this manner, the user of application 16 requires little or no knowledge of the interface protocol of the selected image acquisition device and can readily interact and interface with the selected image acquisition device to acquire a desired amount of images.

FIG. 7 depicts an exemplary preview window 122 that allows a user to see a preview of a video stream acquired by the image acquisition device 38 to ensure that the data being acquired is satisfactory. For example, a user may want to change the position of the image acquisition device, modify the lighting conditions, adjust the focus, or make other changes to the set up of the image acquisition device 38. As such, in step 96, the image acquisition facility 18 opens a window on the display device 30 and renders a video window 126 containing a live video stream using the image acquisition device 38 and the communication channel 74. Those skilled in the art will appreciate that the user can invoke the preview window 126 at any time, for example, the image acquisition facility 18 can simultaneously render the preview window 126 and log or buffer data to file 27 or memory. The video window 126 is adaptable to include a frame that provides a footer bar having an area 127 for displaying a time stamp of the current frame being displayed, an area 128 for displaying the image resolution, an area 129 for displaying the state of the image acquisition facility 18, and a header bar 124 for displaying the name of the image acquisition device hardware interface 36 and device ID. The image preview window 122 allows a user to change one or more characteristics of the image by setting or resetting properties of an associated image acquisition input object 100 or of a selected image acquisition source device object 102A and 102 B, and have the image displayed reflect the changes. For example, the user of application 16 may switch from a first image acquisition device to a second acquisition device by selecting an available image acquisition source device object 102A or 102B and accordingly, the video window 122 updates and provides a live video preview of the second image acquisition device.

FIG. 8 illustrates an exemplary window 180 depicting a montage of images provided by the image acquisition facility 18. The user of application 16 can request the image acquisition facility 18 to display a number of image frames acquired by the image acquisition device 38. The image acquisition facility 18 is capable of rendering a montage of images on the display device 30 by tiling an image sequence into a rectangular montage as depicted in window 180. In this manner, the user of application 16 has the capability to visually compare and contrast acquired image data from the image acquisition device 38. The image acquisition facility 18 can tile image data in any numerical data type supported by the application 16.

Figure 9:
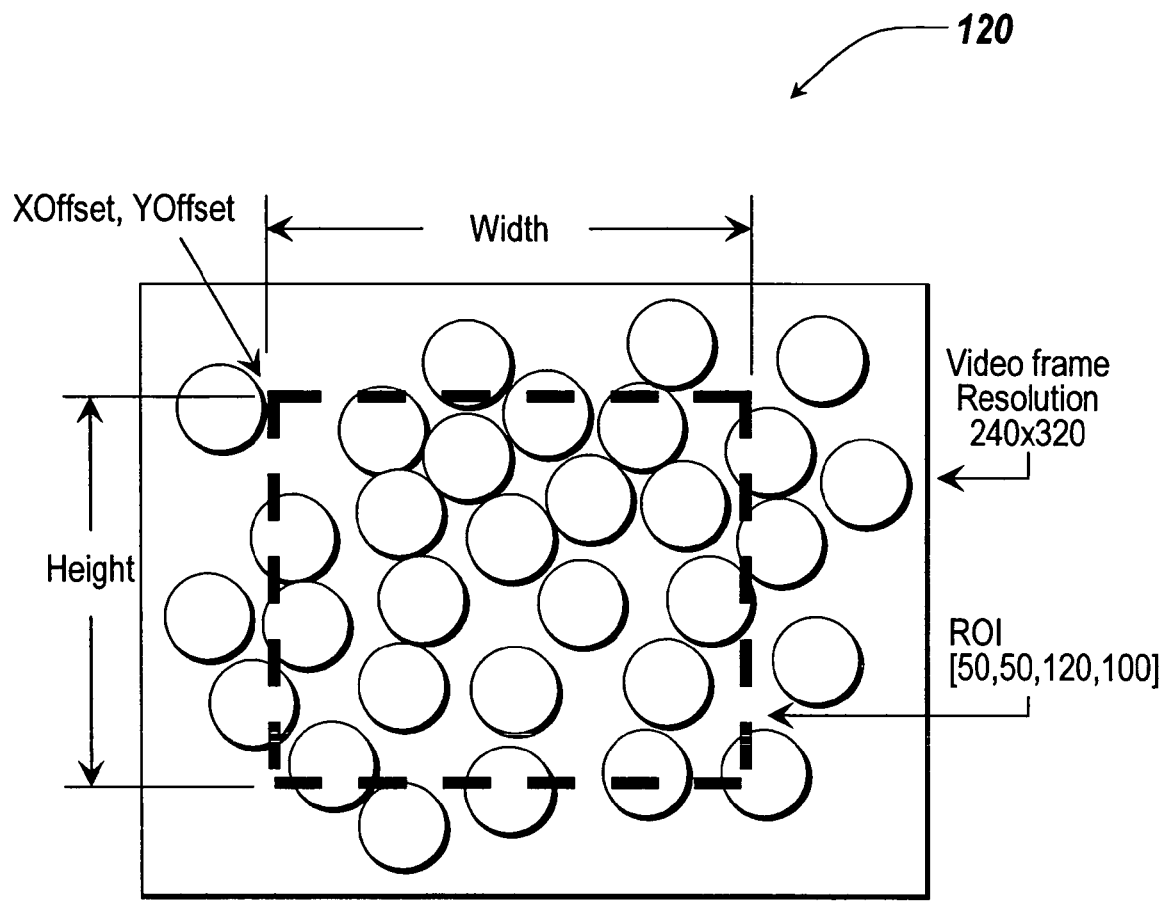
FIG. 9 depicts an exemplary image window and a selected Region of Interest in accordance with the illustrative establishment of the present invention.
Figure 10:
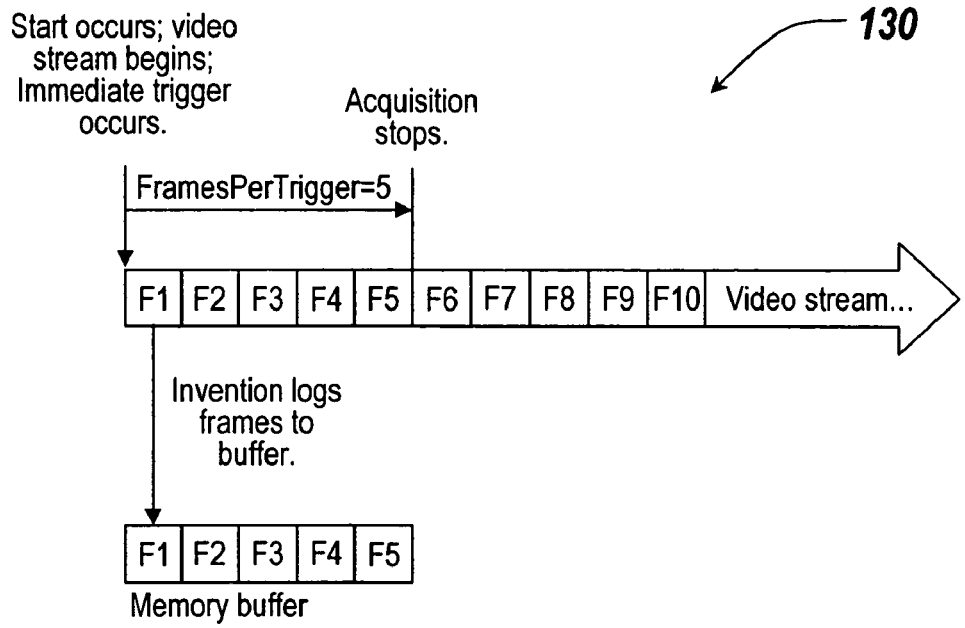
FIGS. 10-12 illustrate various methods for initiating image acquisition suitable for practicing the illustrative embodiment of the present invention.

FIG. 9 illustrates an exemplary video window 120 provided by the illustrative embodiment of the present invention. The video window 120 illustrates a region of interest feature of the image acquisition facility 18. The region of interest (ROI) is taken within a selected image frame or selected image frames and is specified in the illustrative embodiment of the present invention as a vector of four values indicating an X offset, Y offset, region width, and a region height. In this manner, the user of application 16 through user interface 50 defines a region located within an image frame to define the ROI. The image acquisition facility 18 communicates the ROI to the image acquisition device 38 across the communication channel 74 if the image acquisition device 38 supports ROI properties. If the image acquisition device 38 does not support ROI properties, the image acquisition facility 18 manages the ROI request from the user by extracting the requested ROI from acquired image data when returning the image data to the application 16.

The image acquisition facility 18 provides a set of methods for initiating image data transfer from the image acquisition device 38 to the image acquisition facility 18. The image acquisition facility 18 manages memory allocation, memory de-allocation, and memory reuse within the electronic device 12 when storing image data transferred from the image acquisition device 38. To transfer any number of image frames from the image acquisition device 38 to the image acquisition facility 18, the image acquisition input object 100 is first configured to perform the image acquisition requested by the user. Once configured, the image acquisition input object 100 is instructed by the user to perform an image data transfer from the image acquisition device 38.

To initiate an image data transfer using the communication channel 74. The image acquisition facility 18 starts the image acquisition object 100 and the state of the object is communicated to the user. When the desired image acquisition is complete, that is, when all necessary image data is transferred from the image acquisition device 38 to the image acquisition facility 18 the image acquisition is considered complete. At this time, the image acquisition facility 18 communicates the updated state of the image acquisition to the user of application 16. The image acquisition facility 18 can communicate the updated state to the user of application 16 through a property, return value, or other means. Furthermore, the image acquisition facility 18 can communicate the current state of the image acquisition before, during, or after the transfer of data from the image acquisition device 38 to the image acquisition facility 18. The image acquisition facility 18 is configurable to stop any image data transfer between the image acquisition facility 18 and the image acquisition device 38 when the image acquisition is considered complete.

The image acquisition facility 18 is further configurable to allow the user to stop the image data transfer at any desired time. The image acquisition facility 18 is further configurable to allow the user to invoke a method that instructs the image acquisition facility 18 to "wait" which causes the application 16 to refrain from processing any task until the image acquisition is complete. The image acquisition facility 18 does not buffer or log any image data until the image acquisition device 38 is triggered. The image acquisition facility 18 supports a number of ways for triggering the image acquisition device 38.

FIG. 10 illustrates a trigger 130 suitable for use in practicing the illustrative embodiment of the present invention. For the ease of the discussion below with regard to FIGS. 11 through 13 image acquisition triggers are discussed as an action that cause the acquisition of a stream of images, nevertheless those skilled in the art will recognize that the discussion below with regard to image acquisition triggers is equally applicable to an action or actions that cause the acquisition of a single image. In accordance with the trigger 130 the image acquisition facility 18 immediately triggers the image acquisition device 38 upon starting the associated image acquisition input object 100. In this manner when the image acquisition input object 100 changes to a start state, the video stream from the image acquisition device 38 begins and an immediate trigger occurs. As such, the image acquisition facility 18 logs or buffers a number of frames per trigger, in this instance five frames per trigger to the buffer 26. After five frames, the state of the image acquisition input object 100 changes from start to stop and the acquisition completes. Those skilled in the art will recognize that the number of frames per trigger is definable by the user of the application 16 or may be limited by the size of the buffer 26 or the selected image acquisition device 38. Those skilled in the art will recognize that the illustrative embodiment of the present invention is able to trigger the image acquisition device 38 based on events as discussed in more detail below with reference to FIG. 12.

Figure 11:
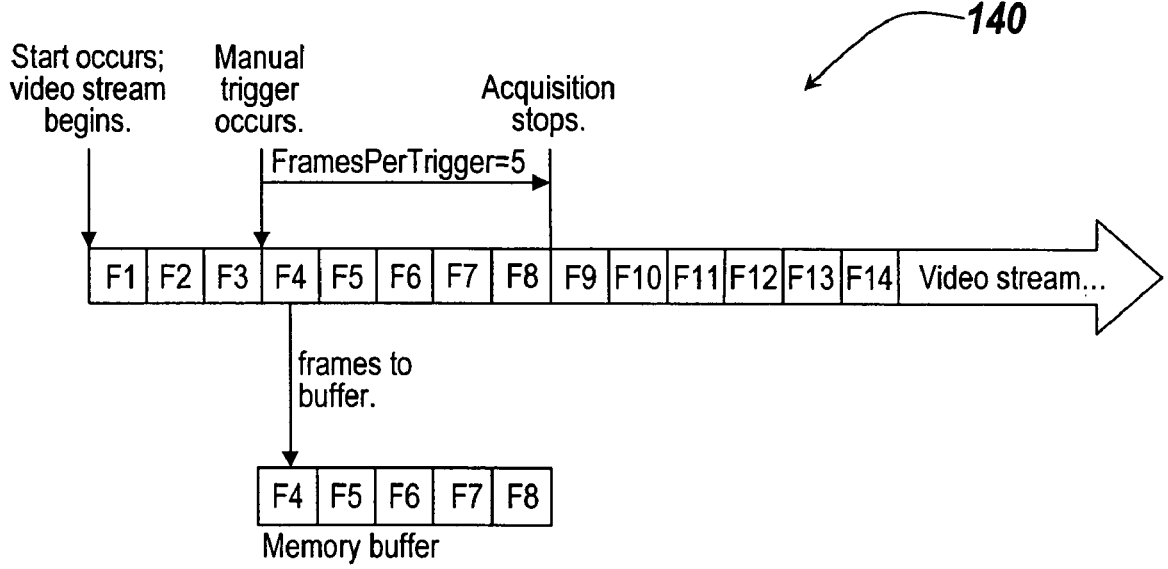

FIG. 11 illustrates a manual trigger 140 that allows the user to manually trigger the image acquisition device 38 using the communication channel 74. As such, when the state of the image acquisition input object 100 changes to start the image acquisition device 38 begins acquiring images and outputs a video stream. However, the image acquisition facility 18 does not buffer or hold any of the frames from the video stream until the start of the fourth frame when the manual trigger occurs from the user of application 16. After receiving the trigger before the start of frame F4, the image acquisition facility 18 then buffers the next five frames to buffer 26. The acquisition is considered complete after the fifth buffered frame because in this instance the triggered acquisition is defined as five frame lengths per trigger. Nevertheless, those skilled in the art will recognize that the number of frames per trigger is definable by the user of application 16.

Figure 12:
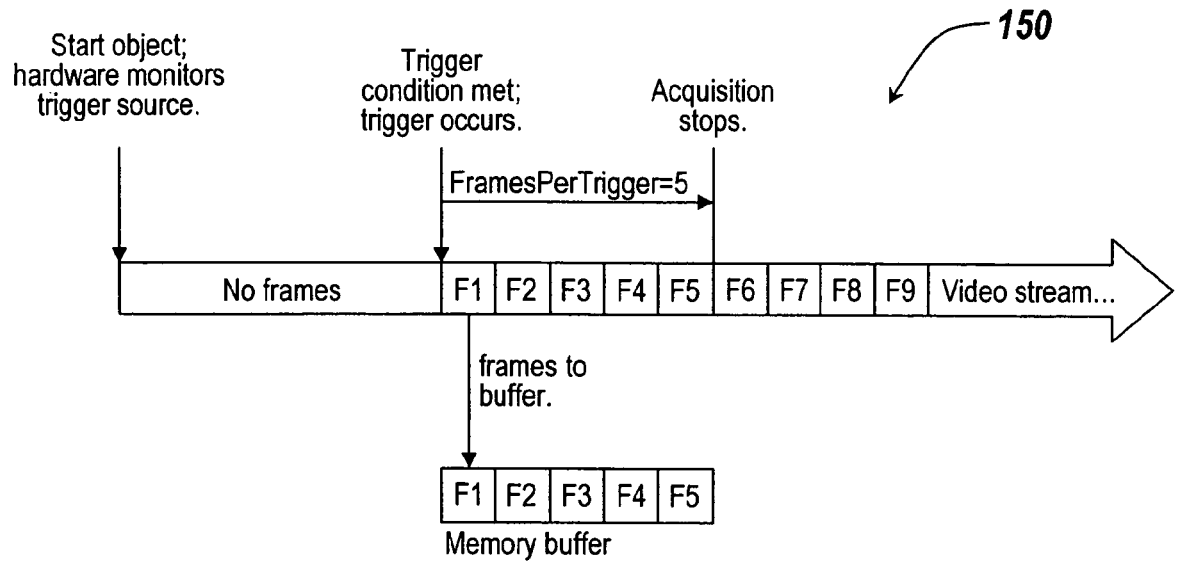

FIG. 12 illustrates trigger 150 that allows the image acquisition device 38 to monitor an external trigger source for a trigger condition to be met. This type of triggering is available to the user of application 16 if the selected image acquisition device 38 or the image acquisition hardware interface 36 supports such a feature. As illustrated, the image acquisition input object 100 changes state to a start state and in turn, the image acquisition device 38 starts to monitor the trigger source. As such, until the image acquisition device 38 identifies a satisfied trigger condition the image acquisition device 38 acquires no images and therefore provides the image acquisition facility 18 with no image frames. At the satisfaction of the trigger condition, triggering occurs and the image acquisition device 38 begins acquiring images and providing image frames to the image acquisition facility 18. In turn, the acquisition facility 18 buffers the received frames to the buffer 26 based on the defined number of frames per trigger. After the defined number of frames per trigger, the image acquisition facility 18 stops buffering frames to the buffer 26 and the image acquisition ends.

Furthermore, those skilled in the art will recognize that the image acquisition facility 18 allows for repeating the triggering of the image acquisition input object 100 a number of additional times as specified by the user of application 16. Further, those skilled in the art will recognize that the image acquisition facility 18 allows for triggering of the image acquisition input object 100 in a number of ways. For example, the image acquisition facility 18 allows for the image acquisition input object 100 to trigger after a user configurable delay. The image acquisition facility 18 also provides for interval logging, that is, logging of image data after every nth image, frame provided by the image acquisition device 38.

The image acquisition facility 18 further provides the user of application 16 with information on the available types of triggers supported by a selected image acquisition device. If an image acquisition device 38 supports hardware triggers, the image acquisition facility 18 provides device specific information on all the available triggers sources for each available trigger condition that the selected image acquisition device 38 provides.

The image acquisition facility 18 is further capable of providing the number of image frames currently available in the storage device 14 for the user to extract or view. The image acquisition facility 18 is further capable of informing the user of application 16 of the total number of image frames acquired since the image acquisition input object 100 started running.

The image acquisition facility 18 is configurable to provide a set of synchronous operations and a set of asynchronous operations for requesting a transfer of acquired image data from the image acquisition facility 18 to the application 16. The set of synchronous operations blocks the application 16 from processing additional tasks until the requested amount of image data is available for transfer. The set of asynchronous operations allows the application 16 to transfer the requested amount of image data or, if not enough image data is available, transfer the image data currently available.

Figure 13:
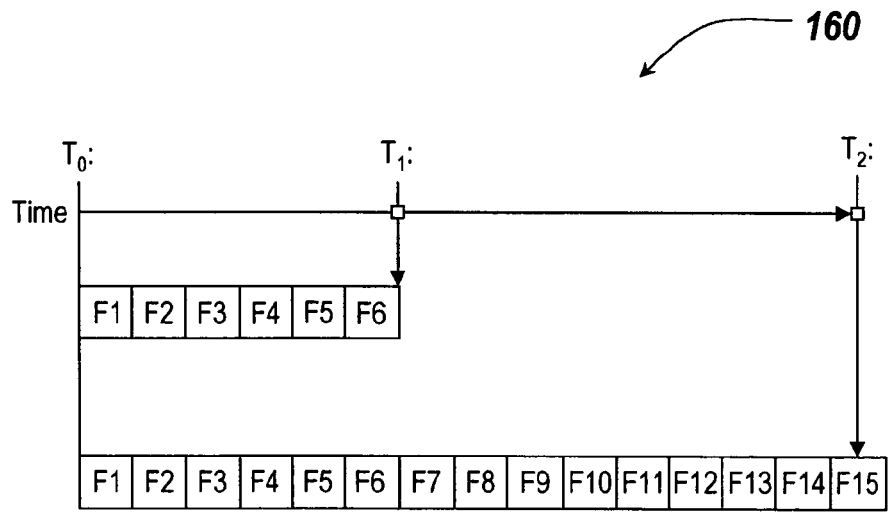
FIG. 13 illustrates an exemplary synchronous data transfer between an image acquisition device and an application in accordance with the illustrative embodiment of the present invention.

FIG. 13 illustrates an exemplary synchronous data transfer 160 from the image acquisition facility 18 to the application 16. The synchronous operation is available for extracting any number of image frames from the image acquisition facility up to the total number of frames available in the image acquisition facility 18. If the number of available frames is not sufficient to meet the request, the image acquisition facility 18 can halt or prevent the image data transfer from beginning until a sufficient number of image frames are available to meet the request. For example, at time $T_1$ there is an insufficient amount of image data to meet the request. Accordingly, the image acquisition facility 18 continues to buffer data from the image acquisition device 38 until time $T_2$ when the buffer 26 holds a sufficient amount of image data to meet the request and then transfers the image data from the buffer 26 to application 16.

Figure 14:
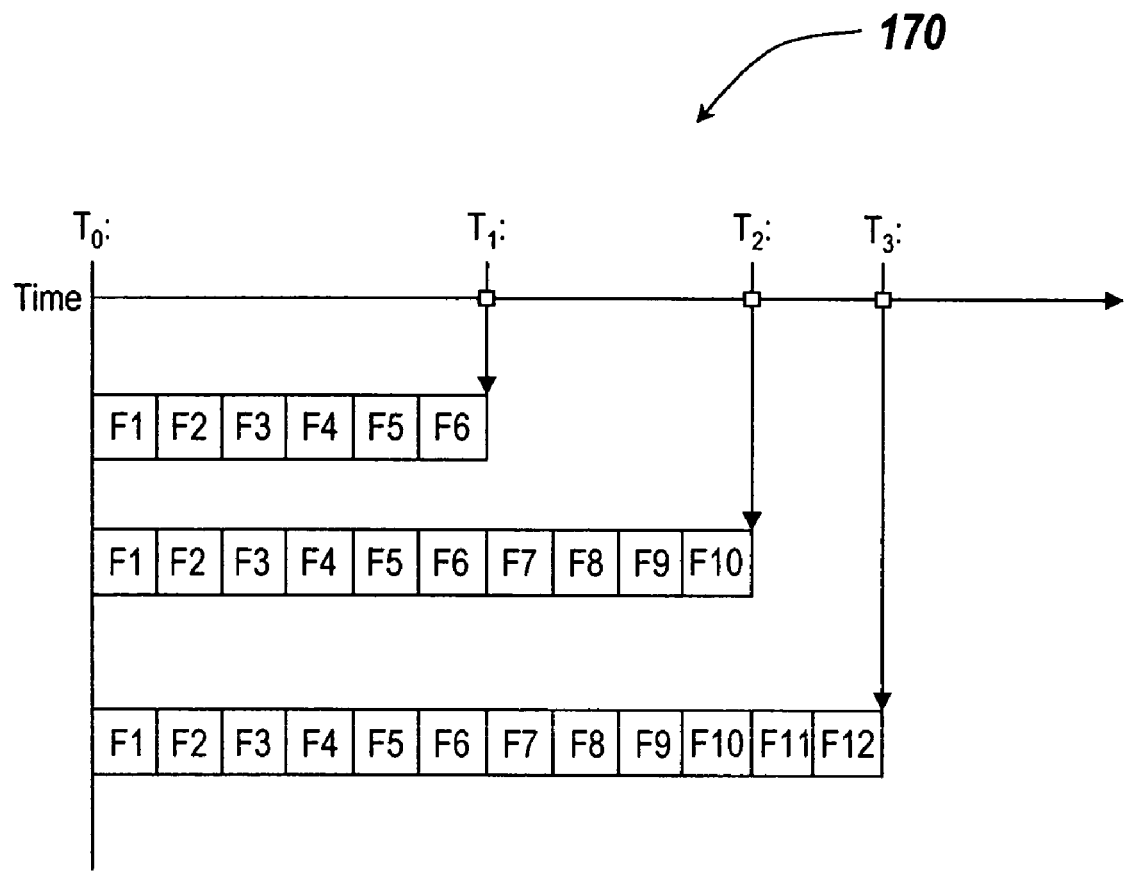
FIG. 14 illustrates an exemplary asynchronous data transfer between an image acquisition device and an application in accordance with the illustrative embodiment of the present invention.

FIG. 14 illustrates an exemplary asynchronous data transfer operation 170 between the image facility 18 and the application 16. In this manner, the image acquisition facility 18 provides image frames to the user for use, but not extraction, using image frames currently stored by the image acquisition facility 18. In the asynchronous operation, the image acquisition facility 18 does not wait for additional image frames to arrive if a sufficient amount of frames are not available.

Nevertheless, those skilled in the art will recognize that the image acquisition facility 18 is adaptable to recognize image meta data, such as time and date data, and in this manner refrains from returning image frames that are older than the last image frame returned from a previous request. For example, at $T_1$ the image acquisition facility 18 provides the user with frames F4 through F6 since three frames were requested, at the time $T_2$ the image acquisition facility provides the user with frames $F_8$ through $F_{10}$ since three frames were requested, and at the time $T_3$ the image acquisition facility provides the user with frames $F_{11}$ through $F_{12}$, since only two new frames, with respect to the previous request at time $T_2$, are available. The image acquisition facility 18 also allows image acquisition input objects and image acquisition source device objects to be saved with their current configuration and reloaded from memory or a suitable storage medium holding the saved configuration. This allows an image acquisition input object 100 and an image acquisition source device objects 102A and 102B to be recreated in the application 16 from a previous user session. In like manner, should one or more image acquisition input objects or one or more image acquisition source device objects no longer be needed they can be removed or deleted from the image acquisition facility 18 or from memory.

The image acquisition facility 18 further provides the capability to generate callbacks to the application 16 when a specified event occurs. The image acquisition facility 18 can define a set of events, each having an image acquisition input object 100 that calls back one or more associated properties in accordance with a request from the user of application 16. In this manner, when a specified event is generated, the associated callback function defined by the property is executed. The callback feature of the image acquisition facility 18 is a program that takes a minimum of two input arguments. The first input argument is the image acquisition input object 100 that generated the event. The second input argument is a structure that provides information on the event that was generated, (i.e. the event type, the time the event occurred, etc.). When an event is generated by the image acquisition facility 18 it can be logged into an event list, accessible to the user through a property, for future use by the user. Such events include, but are not limited to, a run time error that occurred in the hardware driver adaptor 56 or in the image acquisition device 38; an image acquisition device 38 trigger event indicating the image acquisition device 38 triggered; an image acquisition device 38 start event indicating the image acquisition device 38 started; an image acquisition device 38 stop event indicating the image acquisition device 38 stopped; an event indicating that N frames have been acquired by the image acquisition device 38; an event indicating that N seconds have transpired; and other like events.

The image acquisition facility 18 further facilitates the use of information on each hardware driver adaptor 56 available to the user of the application 16. In this manner for each available hardware driver adaptor 56, information on the available image acquisition device 38, and the formats and resolutions supported by each is provided to the user of application 16.

Those skilled in the art will appreciate that each hardware driver adaptor 56 of the image acquisition facility 18 is adaptable to create a list of properties for an associated image acquisition device 38 or an interface associated with the image acquisition device 38 when an image acquisition input object 100 is created. Such image acquisition device properties include hardware settings that expose functionality or configurations supported by a selected image acquisition device or by an interface associated with the image acquisition device 38. Furthermore, those skilled in the art will recognize that the device specific properties are constrainable such that they are aware of the valid values they are settable to.

While the present invention has been described with reference to an illustrative embodiment thereof, one skilled in the art will appreciate that there are changes in form and detail that may be made without departing from the intended scope of the present invention as defined in the pending claims. For example, the image acquisition facility 18 can log data, as such it is capable of logging data to any file format so long as the file format is capable of storing a sequence of images. Furthermore, the image acquisition facility 18 in addition to data logging to file 27 and data buffering to a buffer can send image data to other data sinks capable of accepting such data, for example, a preview window, a user interface, a database, and the like, are well suited for use by the image acquisition facility 18 for storing image data.

Furthermore, the image acquisition facility is capable of accepting image data in any numerical data type provided by the image acquisition device and is capable of accepting image data in any of a number of image color spaces provided by the image acquisition device.

What is claimed is:

1. In an electronic device a method for accessing an image acquisition device associated with the electronic device independently of an interface protocol of the image acquisition device, the method comprising:
   receiving a request to access the image acquisition device, the request specifying a format for a response from the image acquisition device;
   establishing a communication channel with a hardware interface of the image acquisition device, the communication channel operating independently of the interface protocol of the image acquisition device wherein establishing the communication channel comprises:
      communicating with an interface of the image acquisition device to establish communication therewith; and
      establishing one or more communication procedures for communication with the image acquisition device, the communication procedures providing instructions on how data transfers are managed across the communication channel, wherein the one or more communication procedures provides instructions for at least one of: logging data to file, buffering data received from the image acquisition device, configuring selected properties associated with the image acquisition device, generating events, and translating error codes from the image acquisition device;
   configuring properties of the image acquisition device supported independently of the interface protocol of the image acquisition device and accessing a feature of the image acquisition device using the communication channel to receive the response in the specified format, where configuring the properties of the image acquisition device further comprises specifying a color space for images acquired by the image acquisition device.

2. The method of claim 1, wherein the request is received from a user interface.

3. The method of claim 2, wherein said user interface comprises an object based interface having methods and attributes.

4. A method performed in an electronic device for communicating with a selected image acquisition device associated with the electronic device, the method comprising:
   establishing a first communication link between a user of the electronic device and an image acquisition engine the first communication link operating independently of a hardware interface of the selected image acquisition device; and
   establishing a second communication link between the image acquisition engine and an interface of the selected image acquisition device, the second communication link operating independently of an interface protocol of the selected image acquisition device to allow the user to communicate with the selected image acquisition device, wherein the second communication link has one or more communication procedures, the one or more communication procedures providing instructions for at least one of: logging data to file, buffering data received from the selected image acquisition device, configuring selected properties associated with the selected acquisition device, generating events and translating error codes from the selected image acquisition device;
   configuring properties of the image acquisition device supported independently of the interface protocol of the image acquisition device and accessing a feature of the image acquisition device using the communication channel to receive a response in the specified format, where configuring the properties of the image acquisition device further comprises specifying a color space for images acquired by the image acquisition device.

5. The method of claim 4, further comprising:
   associating the image acquisition engine with a driver adapted for communicating with the interface of the selected image acquisition device.

6. The method of claim 4, further comprising:
   abstracting a representation of the selected image acquisition device for use in establishing the second communication link by using information provided by the driver.

7. The method of claim 4, further comprising:
   selecting the image acquisition device from a plurality of image acquisition devices associated with the electronic device.

8. The method of claim 4, wherein the interfacing comprises:
   rendering on a display device of the electronic device a user interface for use by the user for interfacing with the image acquisition engine.

9. The method of claim 4 further comprising:
   triggering the selected image acquisition device on a selected event to acquire one or more images.

10. The method of claim 9 further comprising:
    previewing one or more images from the selected image acquisition device before, while, or after the triggering of the image acquisition device occurs.

11. The method of claim 4 further comprising:
    montaging one or more images acquired by the selected image acquisition device on a display device associated with electronic device.

12. The method of claim 4 further comprising:
    identifying a region of interest for an image acquired by the selected image acquisition device.

13. The method of claim 4, further comprising:
    requesting the image acquisition engine to determine an interface for the selected image acquisition device installed and accessible to the image acquisition engine.

14. The method of claim 4, further comprising:
    requesting the image acquisition engine to determine each interface associated with an image acquisition device installed and accessible to the selected image acquisition engine.

15. The method of claim 14, wherein the image acquisition engine determines each interface associated with an image acquisition installed and accessible to the image acquisition engine across one or more image acquisition device types.

16. The method of claim 4, further comprising:
providing the image acquisition engine with one or more requests for configuring the selected image acquisition device.

17. The method of claim 16, further comprising:
configuring the selected image acquisition device based on each provided request.

18. The method of claim 16, further comprising:
configuring a type of image acquisition based on each provided request.

19. The method of claim 18, wherein the type of image acquisition comprises still image acquisition.

20. The method of claim 18, wherein the type of image acquisition comprises a plurality of images acquired in a sequence.

21. The method of claim 4, further comprising:
requesting the image acquisition engine to acquire a number of images using the selected image acquisition device.

22. The method of claim 21, wherein the number of images comprises a single image.

23. The method of claim 21, wherein the number of images comprises a plurality of images.

24. The method of claim 4, wherein the image acquisition engine is capable of feeding to the user one or more live images from the selected image acquisition device.

25. The method of claim 4, further comprising specifying a color space for the images acquired by the selected image acquisition device.

26. A device readable storage medium holding device executable instructions for performing a method in an electronic device for accessing an image acquisition device associated with the electronic device independently of an interface protocol of the image acquisition device, the method comprising:
accessing a first image acquisition device from a plurality of image acquisition devices, the plurality of image acquisition devices implementing a plurality of different interfaces, by:
automatically determining available types of triggers supported by the first image acquisition device;
providing information on the available types of triggers supported by the first image acquisition device;
accepting a request to access the first image acquisition device;
creating a communication channel with the first image acquisition device, the communication channel operating independently of the interface protocol of the first image acquisition device, wherein the communication channel includes
one or more communication procedures providing instructions on how data transfers are managed across the communication channel, wherein the one or more communication procedures provides instructions for at least one of: logging data to file, buffering data received from the first image acquisition device, configuring selected properties associated with a particular image acquisition device, generating events, and translating error codes from the first image acquisition device; and
accessing a feature of the first image acquisition device using the communication channel operating independently of the interface protocol of the first image acquisition device, the feature affecting a resulting image acquired from the particular image acquisition device.

27. The device readable storage medium of claim 26, wherein the request specifies a format for a response from the first image acquisition device.

28. The device readable storage medium of claim 26, wherein the request is received from a user interface.

29. The device readable storage medium of claim 28, wherein said user interface comprises an object based interface having methods and attributes.

30. A program holding product having instructions executable by an electronic device which, when executed by a processor of the electronic device allows a user of the electronic device to communicate with a selected image acquisition device associated with the electronic device by:
interfacing a user of the electronic device with one of a plurality of image acquisition engines, the plurality of image acquisition engines implementing a plurality of different image acquisition interfaces;
linking the image acquisition engine and an interface of the selected image acquisition device using a communication channel operating independently of an interface protocol of the selected image acquisition device to allow the user to communicate with the selected image acquisition device, wherein the communication channel includes one or more communication procedures that provide instructions on how data transfers are managed across the communication channel, wherein the one or more communication procedures provide instructions for at least one of: logging data to file, buffering data received from the selected image acquisition device, configuring selected properties associated with the selected image acquisition device, generating events and translating error code from the selected image acquisition device;
automatically determining available types of triggers supported by the selected image acquisition device; and
providing information to the user on the available types of triggers supported by the selected image acquisition device.

31. The program product of claim 30, further comprising:
associating the image acquisition engine with a driver adapted for communicating with the interface of the selected image acquisition device.

32. The program product of claim 30, further comprising:
selecting the image acquisition device from a plurality of image acquisitions devices associated with the electronic device.

33. The program product of claim 30, further comprising:
abstracting a representation of the selected image acquisition device for use in linking the image acquisition engine and the interface of the selected image acquisition device provided by the driver.

34. The program product of claim 30, wherein the interfacing comprises:
rendering on a display device of the electronic device a user interface for use by the user for interfacing with the image acquisition engine.

35. The program product of claim 30 further comprising:
triggering the image acquisition device on a selected event to acquire one or more images.

36. The program product of claim 35 further comprising:
previewing one or more images from the selected image acquisition device before, while, or after the triggering of the image acquisition device occurs.

37. The program product of claim 30 further comprising:
montaging one or more images acquired by the selected image acquisition device on a display device associated with electronic device.

38. The program product of claim 30 further comprising:
identifying a region of interest for an image acquired by the selected image acquisition device.

* * * * *

UNITED STATES PATENT AND TRADEMARK OFFICE
CERTIFICATE OF CORRECTION

PATENT NO. : 7,690,004 B1  Page 1 of 1
APPLICATION NO. : 10/729752
DATED : March 30, 2010
INVENTOR(S) : Loren Dean et al.

It is certified that error appears in the above-identified patent and that said Letters Patent is hereby corrected as shown below:

On the cover page, column 2, line 2 (Other Publications), change "May" to -- March --.

Signed and Sealed this

Twentieth Day of July, 2010

David J. Kappos
*Director of the United States Patent and Trademark Office*

UNITED STATES PATENT AND TRADEMARK OFFICE
CERTIFICATE OF CORRECTION

| | | |
|---|---|---|
| PATENT NO. | : 7,690,004 B1 | Page 1 of 1 |
| APPLICATION NO. | : 10/729752 | |
| DATED | : March 30, 2010 | |
| INVENTOR(S) | : Loren Dean et al. | |

It is certified that error appears in the above-identified patent and that said Letters Patent is hereby corrected as shown below:

On the Title Page, Item (73) Assignee, replace "The Math Works, Inc." with

--The MathWorks, Inc.--

Signed and Sealed this
Eighteenth Day of November, 2014

Michelle K. Lee
*Deputy Director of the United States Patent and Trademark Office*